Jan. 10, 1928.
J. BUCHLI
1,655,409
MOTOR DRIVEN RAIL VEHICLE
Original Filed Dec. 23, 1924
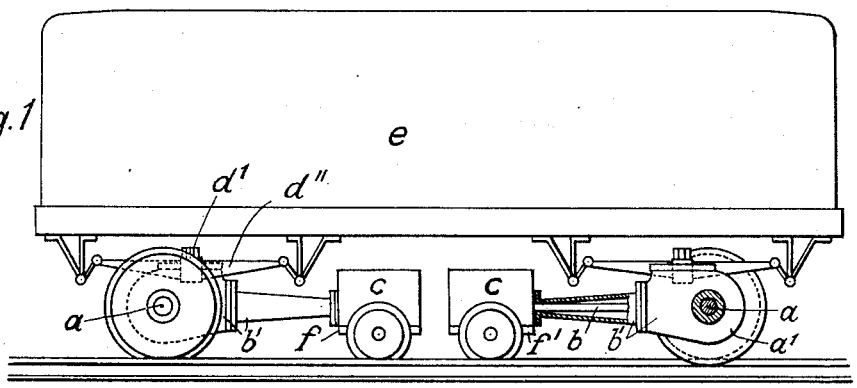
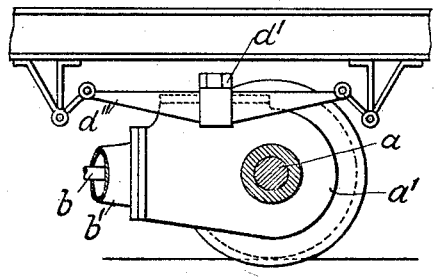 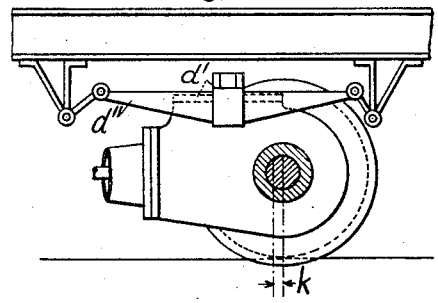
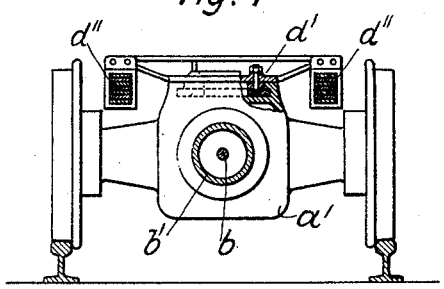
Inventor:
Jacob Buchli
By [signature]
his Atty.

Patented Jan. 10, 1928.

1,655,409

UNITED STATES PATENT OFFICE.

JACOB BUCHLI, OF WINTERTHUR, SWITZERLAND.

MOTOR-DRIVEN RAIL VEHICLE.

Original application filed December 23, 1924, Serial No. 757,601, and in Switzerland December 29, 1923. Divided and this application filed June 5, 1926. Serial No. 113,902.

My invention relates to rail-vehicles such as described in my application, Ser. No. 757,601, filed on Dec. 23, 1924, of which application this is a division.

In rail-vehicles supported in the middle, for example three-axle rail-vehicles, it has already been proposed to make the middle axle movable in its axial direction and to connect the two outer axles pivotally to the middle one in such a manner that they will position themselves approximately radially when travelling along curves. It has also been proposed to make two-axle vehicles of long wheel-base with driving axles which are driven by means of Cardan shafts by motors rigidly attached to the vehicle body between the said driving axles. This proposed kind of drive, however, has the defect that the driving axles position themselves, when on curves, not radially but so that the wheel of the front axle on the inside of the curve leads in advance of the other.

According to my invention the one or more driving motors are arranged not on the vehicle body, but on separate steering frames distinct from said body, which frames are movable laterally in relation to the said body and by which frames the two driving axles are adjusted as by a thill.

As compared with the constructions heretofore proposed, such a drive has a number of important advantages. The driving axles are positively positioned radially on curves and run exceedingly quietly on straight tracks. Both the tires and the rails are preserved, the formation of grooves is avoided and curves are passed silently; also very small radii are possible with long wheel-bases. With a prescribed axle-load the useful total load can be increased, because the weight of the motors is borne by frames specially provided for them. The axle-load of the driving axles may be reduced, when the points of support of the vehicle body are situated on thills connecting the driving axles with the steering frames. As in motor-cars all the gear parts can be enclosed oil-tight, so that waste of oil is avoided. Further, as in motor-cars, the axles can be driven by differential gears whereby loss of power is avoided, and since the motors lie in the longitudinal direction of the vehicle they can be constructed at a lower cost and more favorably, particularly they can be made for high speeds and provided with artificial ventilation and air-filters.

In the appended drawing, in which I have illustrated one embodiment of the invention by way of example, Fig. 1 is a side elevation of a rail-vehicle built in accordance with my invention; Figs. 2 and 3 show portions of this vehicle on an enlarged scale, and Fig. 4 is an end elevation of Fig. 3 as seen from the left-hand side in said figure, parts being shown in section.

Near the two ends of the vehicle are located the driving axles $a$ enclosed in the housings $a'$. The axles $a$ are driven by shafts $b$ each by means of an electric motor $c$. Instead of electric motors, other motors may of course be used, for example, internal-combustion, or Diesel engines. As shown, the motors are not connected with the vehicle body $e$, but are each mounted on a separate chassis or steering frame $f$ and $f'$, each of these frames having its own wheel-base and small wheels. These frames $f$ and $f'$ are free to move laterally under the vehicle body so that they can move to either side. Because of the provision of the shafts $b$ forming radius bars, the axles $a$ are steered by the frames $f$ and $f'$ respectively.

The vehicle body $e$ bears between the two driving-axles $a$ on the couplings $b'$ by means of supporting springs $d''$, and truck bolsters $d'$, supported one on each coupling $b'$, the couplings $b'$ connecting the steering-frames $f$ and $f'$ carrying the driving motors each with the housing $a'$ of one of the driving axles. By this support of the vehicle body $e$ on the couplings $b'$, the weight of the vehicle body is well distributed over the driving axles on the steering frames. From a comparison of Figures 2 and 3, it will be seen that each axle $a$ and the corresponding steering frame can shift relative to the vehicle body $e$ in the longitudinal direction of the latter a distance indicated by $k$, so that shocks on the upper or lower frames are equalized, and a re-adjustment of the axles $a$ in the middle position can take place.

I claim:

1. In a motor-driven rail-vehicle of long wheel-base, the combination with the vehicle body, and two axles, one located near each end of said body and supporting a part of the weight of the same, a steering frame distinct from said vehicle body, one for each axle and movable laterally in relation to said vehicle body, at least one motor mounted on each steering frame, driving means operatively connecting the motor with one of said axles to rotate the same, and a coupling member connecting each steering frame with an axle for steering the latter.

2. In a motor-driven rail-vehicle of long wheel-base, the combination with the vehicle body and two driving axles, one near each end of said body, a steering means divided in two parts, each having an axle provided with wheels supporting one half of said steering means distinct from the vehicle body and movable laterally relative thereto, a motor mounted on each half of said steering means, driving means operatively connecting the motor with one of the said axles to rotate the same, a thill connecting each half of said steering means with an axle for steering the same and means comprising a truck bolster, and springs bearing on them for supporting the weight of said vehicle body.

In testimony whereof I affix my signature.

JACOB BUCHLI.